US006723257B2

(12) United States Patent
Libutti et al.

(10) Patent No.: US 6,723,257 B2
(45) Date of Patent: Apr. 20, 2004

(54) CORROSION INHIBITING COMPOSITION

(75) Inventors: Bruce L. Libutti, Teaneck, NJ (US); Joseph Mihelic, Sparta, NJ (US)

(73) Assignee: Ashland Inc., Dublin, OH (US)

( * ) Notice: Subject to any disclaimer, the term of this patent is extended or adjusted under 35 U.S.C. 154(b) by 0 days.

(21) Appl. No.: 10/021,730

(22) Filed: Oct. 29, 2001

(65) Prior Publication Data

US 2003/0103865 A1 Jun. 5, 2003

(51) Int. Cl.⁷ .................................................. C09K 3/00
(52) U.S. Cl. ............................ 252/388; 422/7; 422/12; 422/14
(58) Field of Search ............................ 252/388; 422/7, 422/12, 13, 14

(56) References Cited

U.S. PATENT DOCUMENTS

| 3,882,029 | A | * | 5/1975 | Fischer et al. | ............... 507/213 |
|---|---|---|---|---|---|
| 4,927,550 | A | * | 5/1990 | Cutcher et al. | .............. 508/158 |
| 5,139,586 | A | * | 8/1992 | Das | ............................. 148/246 |
| 5,332,452 | A | * | 7/1994 | Das | ............................. 148/247 |
| 5,639,515 | A | * | 6/1997 | Kanda et al. | ................ 427/327 |
| 5,849,220 | A | * | 12/1998 | Batton et al. | ................ 252/396 |
| 5,958,850 | A | * | 9/1999 | Matsuzaki et al. | .......... 508/435 |
| 6,042,750 | A | * | 3/2000 | Burlew | ........................ 252/387 |
| 6,613,249 | B1 | * | 9/2003 | Libutti et al. | ................ 252/388 |

* cited by examiner

*Primary Examiner*—Margaret B. Medley
(74) *Attorney, Agent, or Firm*—David L. Hedden

(57) ABSTRACT

This invention relates to a corrosion inhibiting composition for use in commercial, institutional, and industrial water systems. The compositions comprise a mixture of (1) a fatty acid ester, and (2) a polyethylene glycol ester. These compositions are useful in inhibiting the corrosion of metals such as steel, copper, and brass, which are exposed to water.

9 Claims, No Drawings

CORROSION INHIBITING COMPOSITION

CROSS-REFERENCE TO RELATED APPLICATIONS

Not Applicable.

CLAIM TO PRIORITY

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION (1) Field of the Invention

This invention relates to a corrosion inhibiting composition for use in commercial, institutional, and industrial water systems. The compositions comprise a mixture of (1) a fatty acid ester, and (2) a polyethylene glycol ester. These compositions are useful in inhibiting the corrosion of metals such as steel, copper, and brass, which are exposed to water.

(2) Description of the Related Art

The pipes, heat exchangers, equipment, and other components of commercial, institutional and industrial water systems, are often made of metal such as steel, copper, and brass, which corrode after time when subjected to oxygen, moisture, and corrosive gases. Examples of such industrial systems include cooling water systems, boiler systems, including steam condensate, heat transfer systems, refinery systems, pulp and paper making systems, food and beverage systems, and mechanical coolant systems. Examples of institutional and commercial systems include HVAC systems, sterilizers, and kitchen steam tables.

Corrosion of metallic components in these systems can cause system failures and shutdowns. In addition, corrosion products accumulated on the metal surface decreases the rate of heat transfer between the metal surface and the heat transfer medium, such as water, which reduces the efficiency of the system.

In order to inhibit corrosion of the metal surfaces in these systems, especially of steam condensate return lines, volatile amines, filming amines, or amine derivatives are added to water and steam in such systems, e.g. to the feedwater or other injection points used for this purpose. However, amines may have limitations from an environmental or toxicity standpoint, especially in humidification and food contact.

U.S. Pat. No. 5,849,220 discloses the use of non-amine filming inhibitors, which are a combination of a surfactants comprising (1) at least one sorbitan fatty acid ester surfactant, and (2) at least one polyoxyethylene derivative of a sorbitan fatty acid ester. These non-amine inhibitors have environmental benefits because they are less toxic, more biodegradeable, and can be used in many products made for human consumption, because they have a less objectionable odor and taste.

All citations referred to under this description of the "Related Art" and in the "Detailed Description of the Invention" are expressly incorporated by reference.

BRIEF SUMMARY OF THE INVENTION

This invention relates to a corrosion inhibiting composition for use in inhibiting the corrosion of metallic surfaces exposed to water comprising a mixture of:

(1) a fatty acid ester, and (2) a polyethylene glycol ester.

These compositions are useful in inhibiting the corrosion of metals such as steel, copper, and brass, which are exposed to water or other industrial fluids.

The examples herein illustrate that the combination of esters reduces corrosion in steel, copper, and other metallic surfaces, and that this result is unexpected, or synergistic, in view of the limited inhibition effect of the components alone. In addition to the environmental advantages of the corrosion inhibiting compositions described in U.S. Pat. No. 5,849,220, which contains a polyoxyethylene derivative of a sorbitan fatty acid ester, instead of a polyethylene glycol dioleate, the compositions of the subject invention provide improved corrosion resistance when compared to the corrosion inhibiting compositions described in U.S. Pat. No. 5,849,220.

The invention also relates to a method of reducing corrosion on metallic surfaces exposed to water in an industrial, commercial or institutional system, which comprises adding a corrosion inhibiting amount of the composition to the water or steam at an injection point, such that the corrosion inhibiting composition comes into contact with the metal surface.

Examples of such commercial, institutional and industrial systems, which contain metallic components exposed to water, include, for example, cooling water systems, boiler systems, heat transfer systems, refinery systems, pulp and paper making systems, food and beverage systems, mechanical coolant systems, water treatment systems, refinery and oil field processes, metal making, mining and ore processing applications, beverage production, hospital sanitation systems, and pharmaceutical manufacturing.

The corrosion-inhibiting composition is effective over a broad pH range, especially under slightly acidic solutions, preferably between a pH of 5 to 9, more preferably from about 5 to about 7, and most preferably from about 5.5 to about 7. The temperature of the industrial fluid typically ranges from about 10° C. to about 250° C., more typically from about 15° C. to about 95° C. The corrosion inhibiting composition is injected directly into the vapor phase, liquid phase, or both phases of the industrial system.

BRIEF DESCRIPTION OF THE SEVERAL VIEWS OF THE DRAWINGS

Not Applicable.

DETAILED DESCRIPTION OF THE INVENTION

The detailed description and examples will illustrate specific embodiments of the invention will enable one skilled in the art to practice the invention, including the best mode. It is contemplated that many equivalent embodiments of the invention will be operable besides these specifically disclosed. All units are in the metric system and all percentages are percentages by weight unless otherwise specified.

Although other fatty acid esters are useful in formulating the corrosion inhibiting compositions, preferably the fatty acid ester is a sorbitan ester of a saturated fatty acid having from 16 to 18 carbon atoms. Most preferably, the sorbitan fatty acid ester is selected from the group consisting of sorbitan monostearate, sorbitan monopalmitate, sorbitan monooleate, sorbitan sesquioleate, and mixtures thereof. Examples of suitable sorbitan fatty acid esters are sold under the following trademarks: SPAN 60 and ARLACEL 60 (sorbitan monostearate), SPAN 40 and ARLACEL 40 (sorbitan monopalmitate), SPAN 80 and ARLACEL 80 (sorbitan monooleate), and ARLACEL C and ARLACEL 83 (sorbitan sesquioleate).

Although other polyalkalylene glycol esters are useful in formulating the corrosion inhibiting compositions, preferably the polyalkylene glycol ester is the dioleate of polyethylene glycol. The polyethylene glycol dioleates are prepared, according to well known methods, by esterifying a polyethylene glycol, having an average molecular weight of 400 to 800, more preferably from about 500 to 700, most preferably about 600, with oleic acid. Examples of polyethylene glycol dioleates include PEGOSPERSE 600 D diester sold by Lonza The weight ratio of the fatty ester to polyalkylene glycol ester is typically from about 1:1 to 1:10, preferably from about 1:1 to about 1:4, more preferably from about 1:2 to about 1:4.

The dosage of the corrosion inhibiting composition ranges from about 1 ppm to about 60 ppm, based upon the amount of active components (1) and (2) in the corrosion inhibiting composition.

The compositions may contain one or more optional components, for instance thickeners and preservatives.

Abbreviations

The following abbreviations are used:
PGD polyethylene glycol dioleate sold under the tradename PEGOSPERSE 600DO by Lonza
SME sorbitan monoester of stearic acid, sold by ICI under the trade name SPAN 60.
PAG-SME oxyethylene adduct of SME prepared by reacting about 20 moles of ethylene oxide with SME, sold under the trade name TWEEN 60, which is used in the corrosion inhibiting compositions of U.S. Pat. No. 5,849,220.

EXAMPLES

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application all units are in the metric system and all amounts and percentages are by weight, unless otherwise expressly indicated.

To eight-ounce jars were added 230 mL of deionized water and the corrosion-inhibiting treatment, which was omitted for the blank. The solutions were heated to 60° C. to 66° C. and held at that temperature. A pre-weighed C-1010 mild steel corrosion coupon was added to each jar, and the jars were closed with caps perforated with quarter-inch holes to allow contact with air and atmospheric carbon dioxide. The jars were agitated at 145 to 155 cycles per minute for 48 hours. At the end of the contact period the coupons were removed, corrosion products were removed by blasting with glass beads, and the coupons were re-weighed. The dimensional loss rate was calculated from the weight loss.

Examples (Control A, Comparisons A and B, and Example 1)

These examples compare SME alone and PGD alone to a mixture of SME and PGD at a weight ratio of 1 to 4. The results are summarized in Table I.

TABLE I

| (Comparison of SME, PGD, and Mixture) | | | |
|---|---|---|---|
| Example | SME (ppm) | PGD (ppm) | Ratio SME/PGD | Corrosion Rate (mpy) |
| Control A | 0 | 0 | 0 | 35.32 |
| Comparison A | 200 | 0 | 0 | 0.50 |
| Comparison B | 0 | 200 | 0 | 3.41 |
| 1 | 0 | 0 | 40/160 | 0.10 |

These examples illustrate the synergistic effect of using a mixture of SME and PGD rather than SME or PGD alone.

Examples Control B, Comparison C, and Example 2

These examples compare SME-PGD to SME-PAG as described in U.S. Pat. No. 5,849,220.

TABLE II

| Example | SME (ppm) | PAG (ppm) | PGD (ppm) | Corrosion Rate (mpy) |
|---|---|---|---|---|
| Control B | 0 | 0 | 0 | 16.52 |
| Comparison C | 100 | 100 | 0 | 0.34 |
| 2 | 40 | 0 | 160 | 0.05 |

These examples indicate that the mixture of SME and PGD at a 1:4 ratio is more effective than the mixture of SEM and PAG at the same dosage in reducing corrosion.

Examples 3–5

These examples illustrate the effectiveness of SME-PGD at different ratios of SME to PGD.

TABLE III

| Example | SME (ppm) | PGD (ppm) | Ratio (ppm) | Corrosion Rate (mpy) |
|---|---|---|---|---|
| 3 | 100 | 100 | 1:1 | 0.28 |
| 4 | 66.6 | 133.4 | 1:2 | 0.24 |
| 5 | 40 | 160 | 1:4 | 0.10 |

Examples 3–5 illustrate the effect of using different ratios of SME to PGD. The data indicate that the ratio of 1:2 to 1:4 performs the best.

Evaluation of the Foaming Properties of the Corrosion Inhibiting Compositions

The foaming properties of the corrosion inhibiting compositions were also evaluated by a modified "Ross-Miles Foam Test". This compares the foaming tendencies of different products or surfactants in water at various temperatures. The method was used to demonstrate/evaluate foaming tendency of products/treatment dosages.

The test is carried out as follows:
1. 500 ml. of water (the water should be representative of the system[1]) was added to a 1000 ml. graduated cylinder having a cylinder diameter 65 mm. Then 18.0 ppm ortho phosphate is added to the cylinder as a buffer. The resulting pH was about 10.3 and the test was carried out at a temperature of 66° C.–67° C.

Experimental Boiler Water Treated With Caustic and Sodium Phosphate.

2. The recommended treatment dosage was added to 500 ml. of the water sample from step #1 to measure foaming tendency.
3. Then cylinder with contents is shaken vertically at the specified temperature ten times (the times shaken equals the number of cycles). After the tenth time, the initial foam height (t=0) is recorded in mL Then the foam level at t=5 minutes and t=30 minutes is recorded. Whether the foam broke in less than a five minute interval is also noted.
4. The initial appearance of test solution is recorded.

Example (Control, Comparison D, and 8)

(Comparison of Foaming Properties of SME-PGD and SME-PAG)

In these examples, the foaming properties of a mixture of SME and PGD was compared to a mixture of SME and PAG as described in U.S. Pat. No. 5,849,220. The test conditions and results of the foaming test are summarized in Table IV. The foam was measured after 10 cycles.

TABLE IV

| Example | ppm SME/PAG ratio | ppm SME/PGD ratio | Foam Height mL | | |
|---|---|---|---|---|---|
| | | | Initial | After 5 Min. | After 30 Min |
| Comparison D | 1.5/1.5<br>1:1 | 0 | 23 | 19 | 5 |
| 8 | 0 | 0.6/2.4<br>1:1 | Trace | Trace | None |

The test results indicate that the composition containing the SME/PGD produced less foam than the prior art composition. This is significant because it is anticipated that, in many systems, small quantities of the corrosion inhibiting composition will return to the boiler with the steam condensate. If it induces foaming, the foam will carry boiler water with its attendant dissolved solids through the steam-water separation equipment typically in the boiler drum. These impurities in the steam typically deposit in downstream equipment and cause damage such as unbalanced turbines, blocked valves and the like as well as corrosion. Consequently, minimal foaming tendency is desired.

What is claimed is:

1. A corrosion inhibiting composition for use in inhibiting the corrosion of metallic surfaces exposed to an industrial fluid comprising a mixture of (a) a sorbitan ester of a fatty acid having from 16 to 18 carbon atoms, and (b) polyethylene glycol ester, such that the weight ratio of (a) to (b) is about 1:1 to 1:4.

2. The composition of claim 1 wherein component (a) is selected from the group consisting of sorbitan monostearate: sorbitan monopalmitate: sorbitan monooleate: and, sorbitan sesquioleate: and mixtures thereof.

3. The composition of claim 2, wherein component (b) is selected from the group consisting dioleate esters of polyethylene glycol having an average molecular weight of from about 400 to 800.

4. A method of inhibiting corrosion on metallic surfaces in contact with a fluid contained in an industrial fluid system which comprises adding to said fluid an effective corrosion controlling amount of a composition comprising the corrosion inhibiting composition of claims 1, 2, 3, or 4.

5. The method of claim 4 wherein the pH of the fluid is from about 5 to about 9.

6. The method of claim 5 wherein the dosage of corrosion inhibiting composition is from about 1 ppm to about 60 ppm. based on components (a) and (b).

7. The method of claim 6 wherein the temperature of the fluid is from about 10° C. to about 250° C.

8. The method of claim 7 wherein the fluid is an aqueous fluid.

9. The method of claim 8 wherein the industrial fluid system is selected from the group consisting of cooling water systems, boiler systems, heat transfer systems, pulp and paper making systems, and food and beverage systems.

* * * * *